(12) United States Patent
Nakashin

(10) Patent No.: US 11,854,502 B2
(45) Date of Patent: Dec. 26, 2023

(54) DISPLAY METHOD, DISPLAY SYSTEM, AND RECORDING MEDIUM STORING DISPLAY PROGRAM

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/965,993

(22) Filed: Oct. 14, 2022

(65) Prior Publication Data

US 2023/0119949 A1 Apr. 20, 2023

(51) Int. Cl.
| | |
|---|---|
| *G09G 3/34* | (2006.01) |
| *G06T 7/70* | (2017.01) |
| *G06F 3/01* | (2006.01) |
| *G06F 3/041* | (2006.01) |
| *G06V 10/74* | (2022.01) |

(52) U.S. Cl.
CPC .......... *G09G 3/3426* (2013.01); *G06F 3/013* (2013.01); *G06F 3/0412* (2013.01); *G06T 7/70* (2017.01); *G06V 10/761* (2022.01); *G09G 3/3413* (2013.01); *G09G 2320/0626* (2013.01); *G09G 2320/0666* (2013.01)

(58) Field of Classification Search
CPC .............. G09G 3/3426; G09G 3/3413; G09G 2320/0626; G09G 2320/0666; G06T 7/70; G06V 10/761; G06F 3/013; G06F 3/0412
See application file for complete search history.

(56) References Cited

U.S. PATENT DOCUMENTS

| | | |
|---|---|---|
| 2014/0111421 A1 | 4/2014 | Fischer et al. |
| 2014/0132643 A1 | 5/2014 | Yamazaki et al. |
| 2014/0160076 A1 | 6/2014 | Ichieda |
| 2016/0180801 A1* | 6/2016 | Lee ........................ G09G 5/377 |
| | | 345/156 |
| 2016/0334868 A1* | 11/2016 | Pacheco .................. G06F 3/013 |
| 2017/0270844 A1* | 9/2017 | Sun ........................ G09G 3/2003 |

FOREIGN PATENT DOCUMENTS

| | | |
|---|---|---|
| JP | H10-187334 A | 7/1998 |
| JP | 2003-076353 A | 3/2003 |
| JP | 2014-087067 A | 5/2014 |
| JP | 2014-115802 A | 6/2014 |
| JP | 2014-130337 A | 7/2014 |
| JP | 2015-152757 A | 8/2015 |
| JP | 2021-089439 A | 6/2021 |
| WO | WO2016/067366 A | 5/2016 |

OTHER PUBLICATIONS

"Otake Eye Clinic—Symptoms—Excessive Eye Blinking," published by Medical Corporation Hakuyo Association/ Otake Eye Clinic—2 pages.
"MAU Zokei File Tone" published by Musashino Art University,http://zokeifile.musabi.ac.jp/ 2007-2009 Musashino Art University—7 pages.

\* cited by examiner

*Primary Examiner* — Peter D McLoone
(74) *Attorney, Agent, or Firm* — Dority & Manning, P.A.

(57) ABSTRACT

A display method includes displaying an image on a display surface; and differentiating a brightness or a color tone of a first part of the image corresponding to a first user whose face is directed to the display surface, from a brightness or a color tone of a second part of the image that is different from the first part, based on a movement of eyelids of the first user.

19 Claims, 7 Drawing Sheets

DISPLAY METHOD, DISPLAY SYSTEM, AND RECORDING MEDIUM STORING DISPLAY PROGRAM

The present application is based on, and claims priority from JP Application Serial Number 2021-169378, filed Oct. 15, 2021, the disclosure of which is hereby incorporated by reference herein in its entirety.

BACKGROUND

1. Technical Field

The present disclosure relates to a display method, a display system, and a recording medium storing a display program.

2. Related Art

According to the related art, a technique of reducing asthenopia of a user viewing a display screen has been developed. For example, a head-mounted display device disclosed in JP-A-2003-076353 includes a display, an optical unit, a detector, a timer, and a controller. The display displays an image. The optical unit causes the user to visually detect the image displayed on the display. The detector detects whether the user is wearing the head-mounted display device or not. The timer measures a time during which the user is wearing the head-mounted display device as detected by the detector and the image is displayed on the display. The controller changes the visually detected image in such a way as to restrain the asthenopia of the user according to the lapse of time measured by the timer.

The technique described in JP-A-2003-076353 lowers the luminance of the entire display and thus reduces the asthenopia of the user. If this method is applied, for example, to a large screen that is supposed to be used simultaneously by a plurality of users, a reduction in convenience may occur such as lower visibility when the large screen is viewed from a distance.

SUMMARY

A display method according to an aspect of the present disclosure includes: displaying an image on a display surface; and differentiating a brightness or a color tone of a first part of the image that is a part corresponding to a first user whose face is directed to the display surface, from a brightness or a color tone of a second part of the image that is different from the first part, based on a movement of eyelids of the first user.

A display system according to another aspect of the present disclosure includes: a display device displaying an image on a display surface; and a processing device outputting, to the display device, a signal representing the image in which a brightness or a color tone of a first part of the image that is a part corresponding to a first user whose face is directed to the display surface is differentiated from a brightness or a color tone of a second part of the image that is different from the first part, based on a movement of eyelids of the first user.

A non-transitory computer-readable recording medium according to still another aspect of the present disclosure stores a display program. The display program causes a processing device to execute: displaying an image on a display surface; and differentiating a brightness or a color tone of a first part of the image that is a part corresponding to a first user whose face is directed to the display surface, from a brightness or a color tone of a second part of the image that is different from the first part, based on a movement of eyelids of the first user.

DESCRIPTION OF EXEMPLARY EMBODIMENTS

Figure 1:
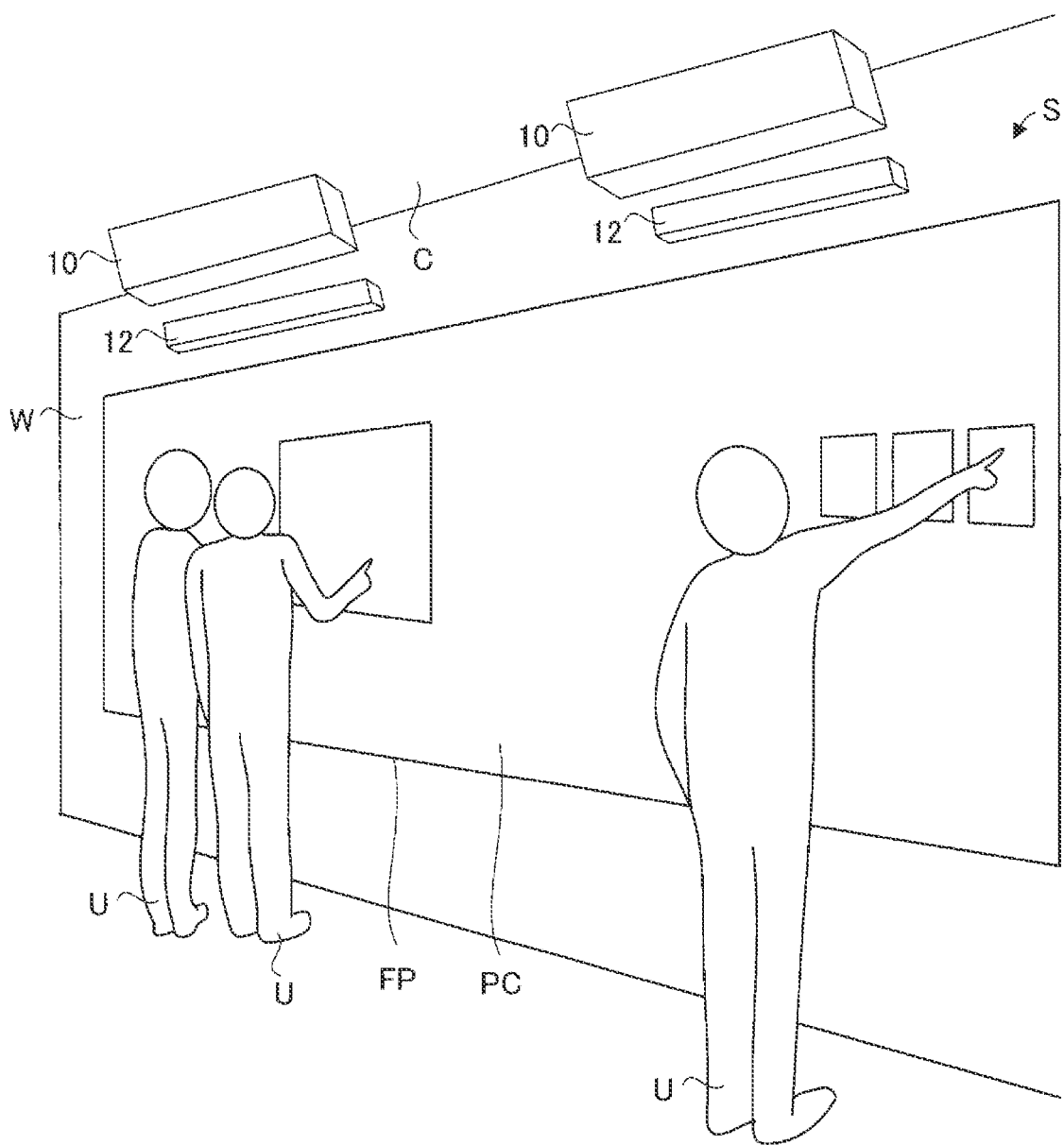
FIG. 1 is a schematic view showing an example of use of a display system according to an embodiment.

A preferred embodiment of the present disclosure will now be described with reference to the accompanying drawings. In the drawings, the dimension or scale of each part differs from reality where appropriate and some parts are schematically shown in order to facilitate understanding. The scope of the present disclosure is not limited to these examples in the embodiment unless the description below includes a description to the effect that the present disclosure should be limited in any particular way.

Embodiment

1. Outline of Display System

FIG. 1 is a schematic view showing an example of use of a display system 1 according to an embodiment. As shown in FIG. 1, the display system 1 is provided in order to display an image in a space S where a large number of people gather, for example, at a station or in a shopping mall. In this embodiment, the display system 1 causes a projector 10 to project a projection image PC on at least a part of a wall W. An area of the wall W where the projection image PC is projected by the projector 10 is defined as a projection area FP. The entire surface of the wall W may be the projection area FP. The projection area FP is an example of a display surface. The projection image PC is an example of an image. The display system 1 may be, for example, a system displaying ac image on a display installed at the wall W. In this case, the surface of the display is equivalent to the display surface.

In this embodiment, the projection area FP in the display system 1 is large enough for a plurality of users U to simultaneously view the projection image PC. In this case, one projection image PC may be projected in the entirety of the projection area FP and a plurality of users U may simultaneously view this projection image PC. Alternatively, a plurality of projection images PC may be projected in the projection area FP and the users U may view different projection images PC from each other. In the latter case, the user U may be a group made up of a plurality of users U moving around together. In this embodiment, it is assumed that one projection image PC is projected in the projection area FP and that the users U view different areas of the projection image PC from each other, as in the former case.

Figure 3:
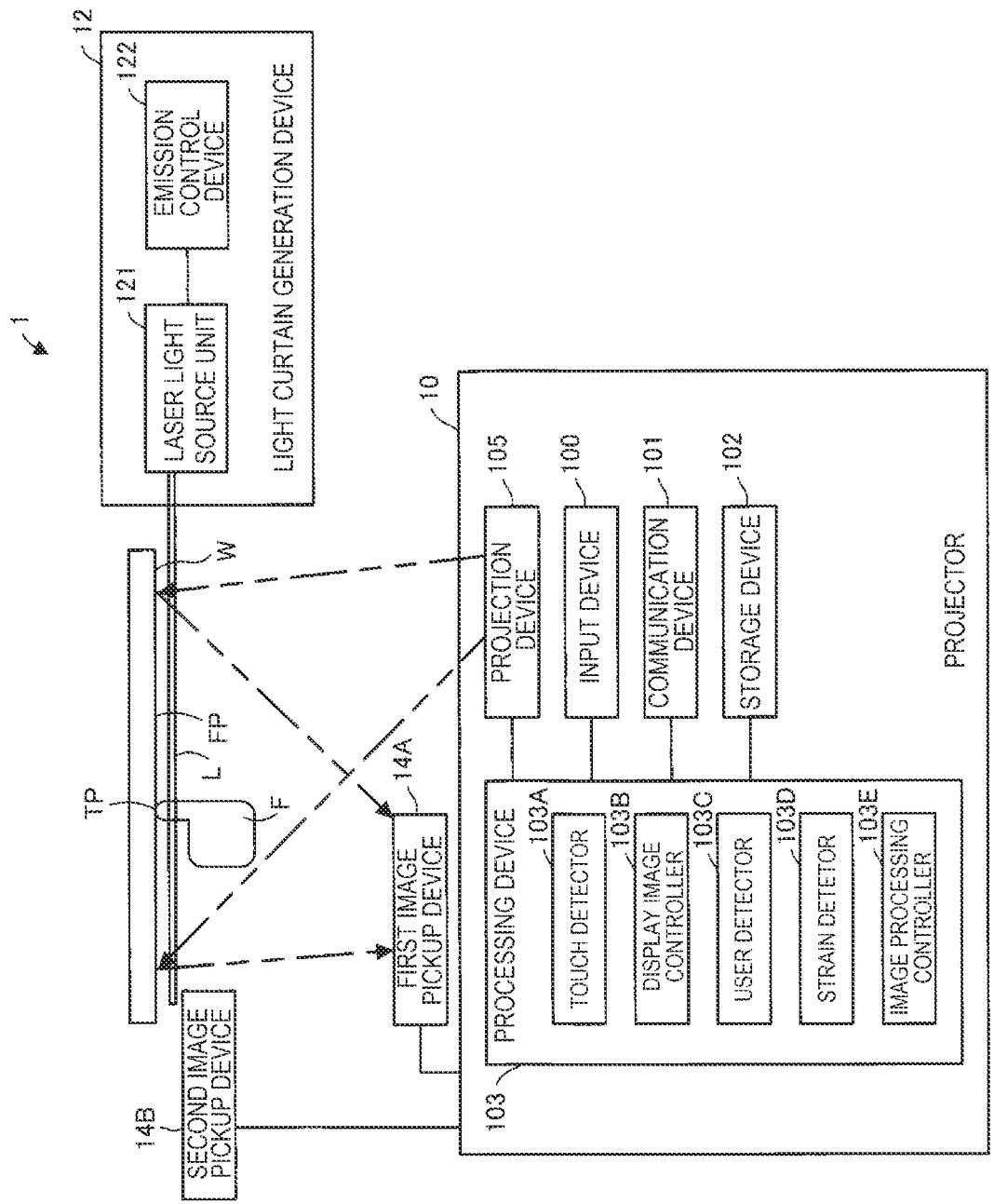
FIG. 3 schematically shows the configuration of the display system.

In the display system 1, a light curtain generation device 12 emits a light curtain L shown in FIG. 3 near the projection area FP. As reflected light of the light curtain L is detected, a position on the projection image PC touched by the user U is detected. In the display system 1, the content of the projection image PC dynamically changes, based on a touch operation performed by the user U to the projection area FP. That is, in the display system 1, interactive image display is performed.

Figure 2A:
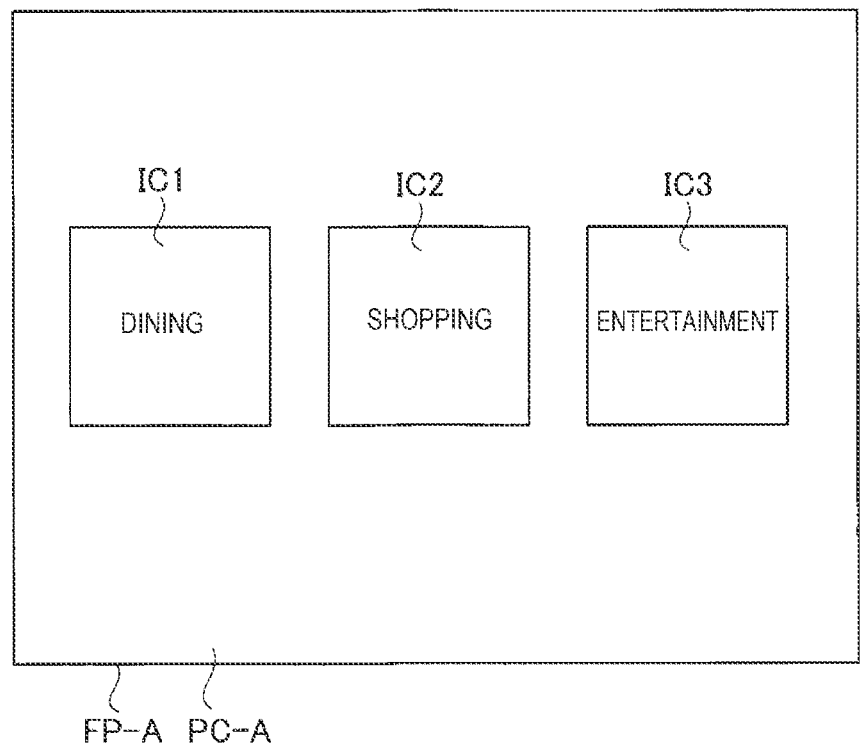
FIG. 2A is a schematic view showing an example of a projection image.
Figure 2B:
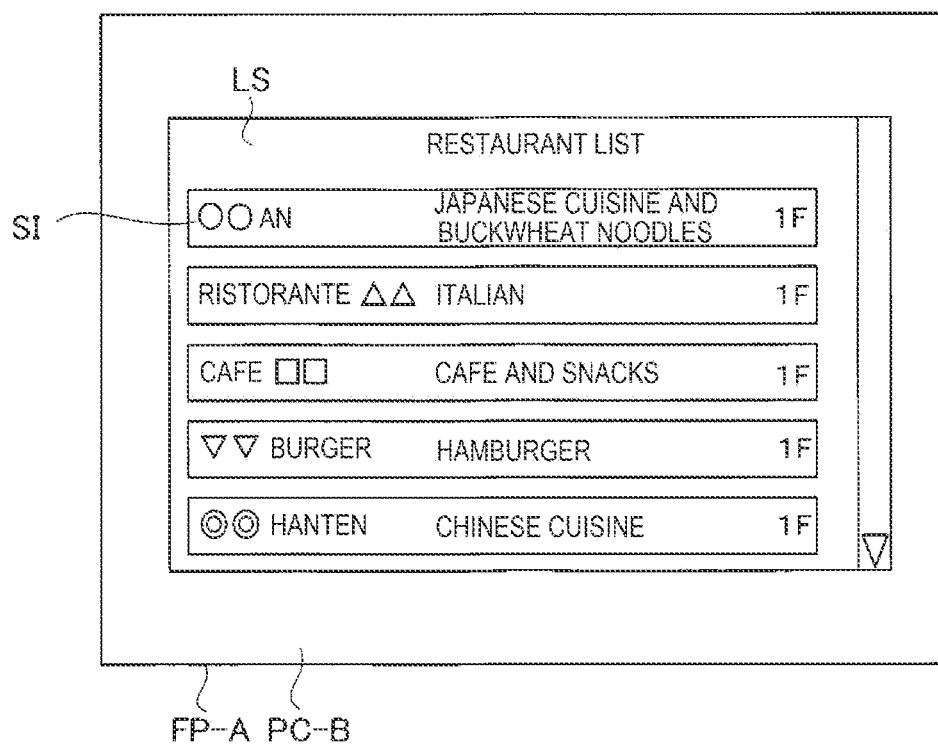
FIG. 2B is a schematic view showing an example of the projection image.

FIGS. 2A and 2B are schematic views showing an example of the projection image PC. FIGS. 2A and 2B show an area FP-A, which is a part of the projection area FP. In the example shown in FIGS. 2A and 2B, a case where the display system 1 is provided in a shopping mall is assumed. In an initial state, an image PC-A displayed in the area FP-A includes a plurality of icons IC1 to IC3. For example, the icon IC1 corresponds to a keyword "dining". Similarly, the icon IC2 corresponds to a keyword "shopping" and the icon IC3 corresponds to a keyword "entertainment". When the user U touches an area where one of the icons IC1 to IC3 is projected, a list LS of shops in the shopping mall corresponding to the keyword of this icon IC is displayed.

For example, when the user U touches the area where the icon IC1 corresponding to "dining" is projected, an image PC-B including a list LS of restaurants in the shopping mall is displayed, as shown in FIG. 2B. That is, the list LS of restaurants is a part of the projection image PC that has changed in response to the touch by the user U.

The list LS of restaurants includes outline information SI about the shops including the names of the restaurants, the genre of food provided there, and approximate position information such as floor. When the user U touches an area where the outline information SI of one of the shops is projected, detailed information such as the position information, the information about open hours, and the menu information of this shop, is displayed.

The display system 1 may also be a system displaying a predetermined image regardless of whether an operation is performed by the user U or not, instead of performing interactive image display.

2. Configuration of Display System

FIG. 3 is a block diagram showing the configuration of the display system 1. The display system 1 has the projector 10, the light curtain generation device 12, a first image pickup device 14A, and a second image pickup device 14B. As shown in FIG. 1, the display system 1 has a relatively large projection area FP. Therefore, at least one of the projector 10, the light curtain generation device 12, the first image pickup device 11A, and the second image pickup device 141 may be provided in a plural number. For example, a plurality of device sets, each set including the projector 10, the light curtain generation device 12, the first image pickup device 14A and the second image pickup device 14B, may be arranged along the direction of the width of the wall W shown in FIG. 1.

The first image pickup device 14A has a CCD (charge-coupled device) image sensor receiving light in the infrared range and the visible range, as an image pickup element. The image pickup element is not limited to a CCD image sensor but may also be, for example, a CMOS (complementary metal-oxide semiconductor) image sensor receiving light in the infrared range and the visible range. An infrared filter is attached to the first image pickup device 14A in order to receive reflected light of the light curtain L formed by an object such as a finger F of the user U. The first image pickup device 14A generates first captured image data corresponding to a first captured image formed by picking up an image of the projection area FP on the wall W. When a part of the light curtain L is reflected by an object, the first captured image data includes the reflected light of the light curtain L formed by the object. The first image pickup device 14A may be integrated, for example, with the projector 10. The first image pickup device 14A outputs the first captured image data to the projector 10.

The second image pickup device 14B has a CCD image sensor receiving light in the visible range, as an image pickup element. The mage pickup element is not limited to a CCD image sensor but may also be, for example, a CMOS image sensor receiving light in the visible range. The second image pickup device 14B captures an image of an area facing the projection area FP and thus outputs second captured image data corresponding to a second captured image. In an example, the second image pickup device 14B is installed at the wall W, having the direction of image pickup along the direction of a normal line to the wall W. This is for the purpose of picking up an image of the face of the user U whose face is directed to the projection area FP, as the second captured image. The second image pickup device 14B outputs the second captured image data to the projector 10.

The light curtain generation device 12 is installed above the projection area FP, on the wall W, as shown in FIG. 1. The light curtain generation device 12 may be installed at a part of a ceiling C instead of the wall W. The light curtain generation device 12 emits the light curtain L, which is planar light along the surface of the wall W. The light curtain L is not limited to planar light and may be light in other shapes. The light curtain L is light in the infrared wavelength band. In this embodiment, the light curtain L advances along the wall W and covers at least the projection area FP on the wall W. The light curtain L is emitted in such a way as to be spaced apart from the surface of the wall W by a distance of several millimeters in the direction of the normal line. In order to improve the detection accuracy for a touch position TP, it is preferable to reduce the distance between the light curtain L and the wall W. However, if the light curtain L and the wall W are too close to each other, a detection error may occur depending on the surface state or the like of the wall W. Therefore, the distance between the light curtain L and the wall W is suitably adjusted.

The light curtain L is used to detect the touch position TP on the projection image PC designated by the user U. In many cases, it is assumed that the user U touches the projection image PC with the finger F of the user U. However, the projection image PC may be touched with a stick or a pen or the like.

Specifically, the light curtain generation device 12 includes a laser light source unit 121 and an emission control device 122 controlling the laser light source unit 121.

The laser light source unit 121 emits the light curtain L. As described above, the light curtain L is light in the infrared wavelength band. The laser light source unit 121 emits laser light in the infrared wavelength band. The laser light source unit 121 is, for example, a unit made up of one LD (laser diode) or a plurality of IDs with optical components such as a collimating lens and a Powell lens attached thereto. The light curtain generation device 12 is not limited to the laser light source unit 121 and may include a unit emitting the light curtain L, for example, using an LED (light-emitting diode).

The emission control device 122 controls the angle of emission of the light curtain L to the wall W and the position of emission of the light curtain L on the wall W, or the like. The emission control device 122 includes an actuator adjusting the direction and position of the laser light source unit 121, a control device controlling the actuator, and the like.

The projector 10 is installed at the ceiling C coupled to the wall W, as shown in FIG. 1. The projector 10 may be installed at a past of the wall W instead of the ceiling C. The display surface where the projector 10 projects as image is not limited to the wall W and may be, for example, a screen or the like.

The projector 10 includes an input device 100, a communication device 101, a storage device 102, a processing device 103, and a projection device 105.

The input device 100 includes, example, various operation buttons and operation keys or a touch panel accepting an input or the like given by the manager of the display system 1. The input device 100 may be a remote controller transmitting information inputted from the manager to the projector 10, wirelessly or via a wire. In this case, the projector 10 has a receiving device receiving information transmitted from the remote controller. The remote controller has various operation buttons and operation keys or a touch panel accepting an input from the manager.

The communication device 101 is an interface for communicating with another device. In this embodiment, the communication device 101 communicates with an image server, not illustrated. The communication by the communication device 101 may be wireless communication or wired communication. When performing wireless communication, the communication device 101 has a communication circuit and an antenna or the like and performs wireless communication, for example, by a Bluetooth or Wi-Fi wireless method. Bluetooth and Wi-Fi are registered trademarks. When performing wired communication, the communication device 101 has a communication circuit, and a connector or the like to which a wiring for communication is coupled.

The storage device 102 is a computer-readable recording medium. The storage device 102 has, for example, a RAM (random-access memory), a ROM (read-only memory), and an EEPROM (electrically erasable programmable read-only memory). The storage device 102 stores various kinds of information and programs processed by the processing device 103. The programs include a display program.

The projection device 105 projects the projection image PC in the projection area FP on the wall W. The projection device 105 is an example of a display device and has an image processing circuit, a frame memory, a liquid crystal light valve, a light valve drive circuit, a light source, a projection system, and the like. The image processing circuit receives image data from the processing device 103 or an image supply device such as an image server, not illustrated, and then loads the image data into the frame memory and performs necessary image processing. The image processing is, for example, processing of converting the resolution of the image data into the resolution of the liquid crystal light valve, geometric correction processing of resolving a keystone distortion, or the like. The image-processed image data is converted into an image signal, and the liquid crystal light valve or the like is driven, based on the image signal. Thus, the image data is projected as an image. The projection device 105 may also employ, for example, the DLP (Digital Lighting Processing, trademark registered) method as well as the foregoing liquid crystal method using the liquid crystal light valve or the like. When the display device is a display, the display device has a light source and a display panel or the like.

The processing device 103 is formed, for example, by a single processor or a plurality of processors. In an example, the processing device 103 is formed by a single CPU (central processing unit) or a plurality of CPUs. A part or all of the functions of the processing device 103 may be formed by a circuit such as a DSP (digital signal processor), an ASIC (application-specific integrated circuit), a PLD (programmable logic device), or an FPGA (field-programmable gate array). The processing device 103 executes various kinds of processing in parallel or successively.

The processing device 103 reads and executes the display program from the storage device 102 and thus implements a touch detector 103A, a display image controller 103B, a user detector 103C, a strain detector 103D, and an image processing controller 103E. A part or all of the touch detector 103A, the display image controller 103B, the user detector 103C, the strain detector 103D, and the image processing controller 103E may be formed by hardware such as an FPGA.

The touch detector 103A detects that the projection area FP is touched. The touch detector 103A assumes and detects that the projection area FP is touched, when reflected light of the light curtain L appears in the first captured image data captured by the first image pickup device 14A.

The touch detector 103A also detects a touch position on the projection area FP. When the projection area PP is touched, the touch detector 103A detects the touch position TP on the projection area FP, based on first calibration data and the first captured image data. The first calibration data is data establishing the correspondence between coordinates on the image loaded in the frame memory of the projection device 105 and coordinates on the first captured image data. The coordinates on the frame memory correspond to the coordinates on the projection area FP. By using the first calibration data, the touch detector 103A can convert the touch position on the first captured image data into the touch position TP on the projection area FP.

The display image controller 103B controls the image projected as the projection image PC, based on the touch position TP on the projection area FP. That is, the display image controller 103B changes a part of the projection image PC in response to a touch on the projection area FP.

The display image controller 103B transmits the coordinates of the touch position TP on the projection area FP, for example, to the image server. The image server specifies a next display image, which is the next image to be displayed in the periphery of the touch position TP, based on the coordinates of the touch position TP on the projection area FP and the image data of the projection image PC currently displayed in the projection area FP, and transmits image data of the next display image to the projector 10. To describe this with reference to the example shown in FIGS. 2A and 2B, for example, it is assumed that the projection image PC currently projected in the projection area FP is the image PC-A shown in FIG. 2A and that the coordinates of the touch position TP are included in the display range of the icon IC1 correspond ng to "dining". In this case, the image server transmits image data of the image PC-B shown in FIG. 2B as the next display image. The display image controller 103B causes the image data transmitted as the next display image to be projected as the projection image PC in the projection area FP.

The user detector 103C detects the user U viewing the projection area FP, based on the second captured image captured by the second image pickup device 14B. The user detector 103C specifies, for example, an area having a feature point corresponding to a person in the second captured image and specifies the position of the user U on the second captured image. The user detector 103C also detects the line of sight of each user U and detects the user U whose line of sight is directed to the projection area FP. Hereinafter, the user U viewing the projection area FP detected by the user detector 103C is referred to as a "target user UT". The target user UT is an example of a first user.

The strain detector 103D detects a movement of the eyelids of the target user UT, based on the second captured image. The strain detector 103D also determines whether the movement of the eyelids of the target user UT appearing in the second captured image is a first state or not. The first state is, for example, a movement of the eyelids that occurs when the target user UT is likely to have asthenopia. Generally, the user U viewing a display image for a long time gets eyestrain. The user U with eyestrain shows a characteristic movement of the eyelids such as increased blinking or narrowing the eyes, compared with when the user U does not have eyestrain. In this specification, "asthenopia" and "eyestrain" are considered to have the same meaning.

Thus, in this embodiment, the first state is a state where the number of blinks per unit time of the target user UT is increased by a predetermined value or more from an initial state. The initial state can be defined as, for example, the number of blinks per unit time immediately after the target user UT is detected by the user detector 103C.

A second state is defined as a different state from the first state. The second state is, for example, state other than the first state. In this embodiment, the second state includes a state where the number of blinks per unit time of the target user UT is increased by less than a predetermined value from the initial state, a case where the number of blinks per unit time of the target user UT is not changed from the initial state, and a case where the number of blinks per unit time of the target user UT is reduced from the initial state. The first state and the second state are not limited to the numbers of blinks and may be defined by, for example, the ratio of the area of the eyes to the area of the face of the target user UT in the second captured image, or the like.

The image processing controller 103E instructs the image processing circuit to perform image processing on a part of the projection image PC. The image processing controller 103E differentiates the brightness or the color tone of a first part P1, which is a part corresponding to the target user UT of the projection image PC, from the brightness or the color tone of a second part P2 that is different from the first part P1 of the projection image PC, based on the movement of the eyelids of the target user UT whose face is directed to the projection area FP.

The first part P1, which will be described in detail later, includes, for example, a part of the projection image PC facing the target user UT. The second part P2 is a part of the projection image PC excluding the first part P1. In other words, the second part P2 is a part having the same brightness or color tone as the brightness or the color tone of the first part P1 as of before the movement of the eyelids of the target user UT turns into the first state.

In this embodiment, the brightness is, for example, the luminance of the projection image PC. Differentiating the brightness is, for example, differentiating the luminance. Differentiating the brightness may also be, for example, differentiating the contrast ratio, which is the ratio between the maximum luminance and the minimum luminance of the projection image PC, or differentiating a γ value indicating the relationship between the magnitude of the input image signal and the luminance of the image. Also, in this embodiment, the color tone is, for example, at least one of luminosity and saturation. For example, a color filter may be superimposed on the first part P1 so as to change the apparent brightness of the first part P1.

In this embodiment, when the movement of the eyelids of the target user UT is the first state, the image processing controller 103E makes the brightness of the first part P1 lower than the brightness of the first part P1 as of when the movement of the eyelids of the target user UT is the second state, which is different from the first state. As described above, the first state is a state where the number of blinks per unit time of the target user UT is increased by a predetermined value or more from the initial state and where it is supposed that the target user UT has eyestrain.

Generally, the projection image PC is displayed more brightly than the peripheral environment. Therefore, continuing to view the projection image PC for a long time may cause eyestrain. In the display system 1, when it is predicted that the target user UT viewing the projection image PC has eyestrain, the brightness of the first part P1 including the part viewed by the target user UT, of the projection image PC, is lowered. Thus, the stimulus received by the eyes of the target user UT can be reduced and the eyestrain of the target user UT can be alleviated.

The image processing controller 103E may change the brightness of the first part P1 according to the number of blinks per unit time in the first state. For example, it is assumed that the first state is a state where the number of blinks per unit time of the target user UT is increased by 20% or more from the initial state. In this case, in a state where the number of blinks is increased by a range of 20% or more and less than 30% from the initial state, the brightness of the first part P1 is changed by −5%. In a state where the number of blinks is increased by a range of 30% or more and less than 40% from the initial state, the brightness of the first part P1 is changed by −10%. That is, the brightness of the first part P1 is lowered more as the degree of increase in the number of blinks becomes higher. Thus, the brightness of the first part P1 can be adjusted according to the degree of the eyestrain of the target user UT and both the alleviation of the eyestrain and the visibility of the projection image PC can be achieved. The brightness of the first part P1 may be changed, for example, by up to approximately −30%.

When the movement of the eyelids of the target user UT is the first state, the image processing controller 103E may change the color tone of the first part P1 instead of or along with the brightness of the first part P1. Specifically, for example, at least one of the luminosity and the saturation of the first part P1 may be lowered. In this case, too, the stimulus received by the eyes of the target user UT can be reduced and the eyestrain of the target user UT can be alleviated.

If the brightness or the color tone of the first part P1 suddenly changes while the target user UT is continuously viewing the first part P1, the target user UT may feel that something is wrong or may suspect a malfunction of the display system 1. Therefore, when the image processing controller 103E has changed the brightness or the color tone of the first part P1, the processing device 103 may notify the target user UT that the brightness or the color tone has been changed. Any method for notification can be employed. For example, an image showing a message or an icon to the effect that the brightness or the color tone has been adjusted may be displayed on the first part P1 or at a position in contact with the outer edge of the first part P1. The manager of the display system 1 may be able to set whether to give this notification or not, for example, via the input device 100 of the projector 10.

When a predetermined condition is satisfied after the brightness or the color tone of the first part P1 is changed, the image processing controller 103E may return the brightness or the color tone of the first part P1 to the state before the change. The predetermined condition is, for example, a condition satisfied when it is highly likely that the target user UT has stopped viewing the first part P1. Specifically, the predetermined condition is, for example, that there is no touch operation performed by the target user UT for a predetermined time period or longer, that the state where the face of the target user UT is not directed to the projection image PC continues for a predetermined time period or longer, that the target user UT is at a predetermined distance or farther from the projection area FP, or the like. When at least one of these conditions is satisfied, it is highly likely that the target user UT has stopped viewing the first part P1. Therefore, the image processing controller 103E returns the brightness or the color tone of the first part P1 to the state before the change.

That is, when at least one of the following conditions 1 to 3 is met, the image processing controller 103E may return the brightness of the first part P1 to the brightness of the first part P1 as of when the movement of the eyelids of the target user UT is the second state. The condition 1 is a case where, within a first predetermined time period after it is detected that the projection area FP is touched, another touch is not carried out within a second predetermined distance from the position touched in the projection area FP. The condition 2 is a case where the state where the face of the target user UT is not directed to the projection area FP continues for a second predetermined time period or longer. The condition 3 is a case where the target user UT is at a third predetermined distance or farther from the projection area FP. Being within the second predetermined distance may be, for example, being within the range of the projection image PC changed by the previous touch operation.

3. Operation of Display System 1

Figure 4:
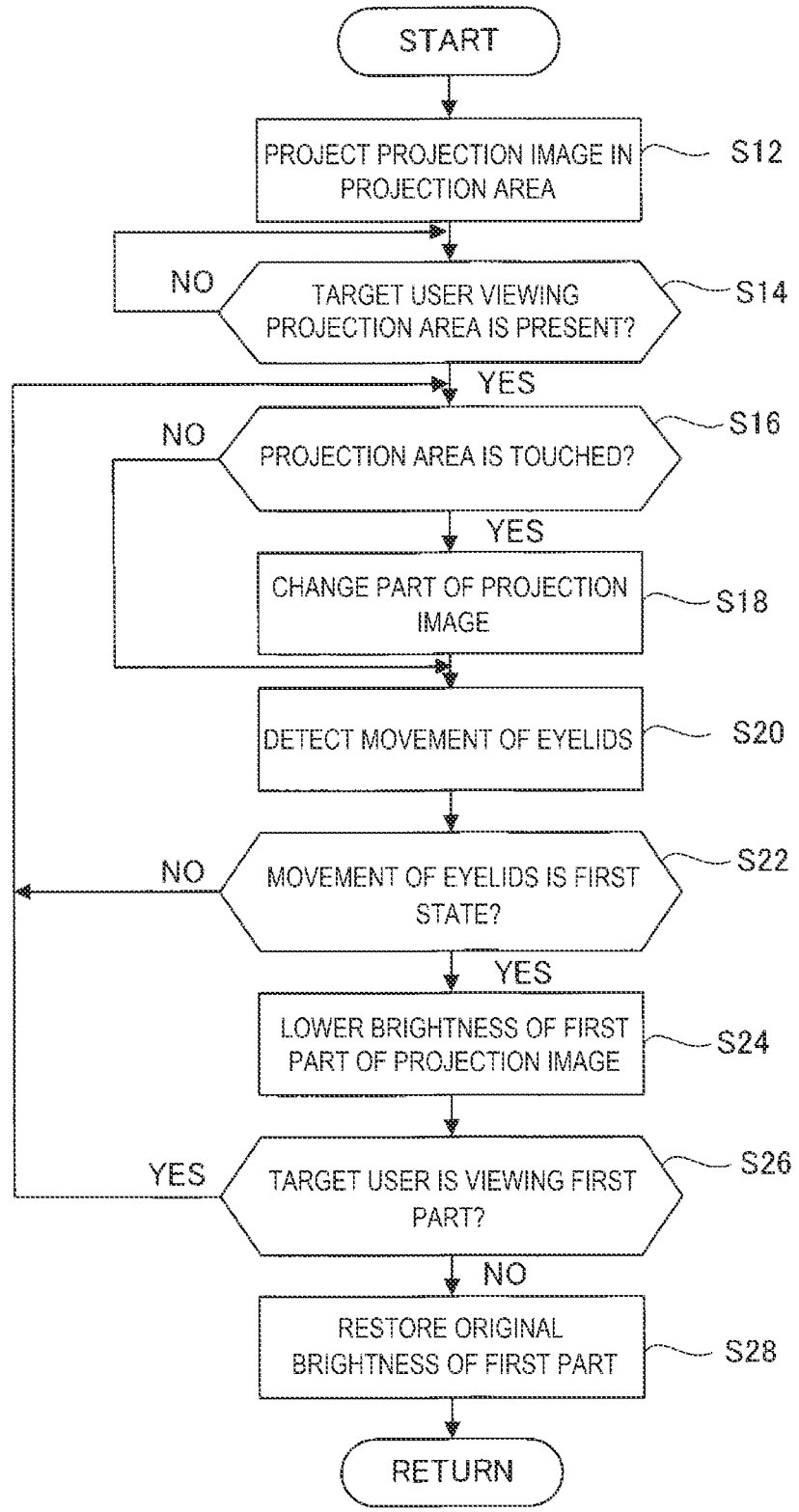
FIG. 4 is a flowchart showing a procedure of processing by a processing device.

FIG. 4 is a flowchart showing a procedure of processing by the processing device 103. The processing device 103 functions as the display image controller 103B and thus projects the projection image PC in the projection area FP (step S12). The processing device 103 functions as the user detector 103C and thus detects the user U viewing the projection area FP, that is, the target user UT (step S14). The processing device 103 waits while there is no target user UT (NO in step S14). When the target user UT is present (YES in step S14), the processing device 103 functions as the touch detector 103A and thus determines whether the projection area PP is touched or not (step S16). When the projection area FP is touched (YES in step S16), the processing device 103 functions as the display image controller 103B and thus changes a part of the projection image PC, based on the touch position TP (step S18) Meanwhile, when the projection area FP is not touched (NO in step S16), the processing device 103 shifts the processing to step S20 without changing the projection image PC.

The processing device 103 functions as the strain detector 103D and thus detects a movement of the eyelids of the target user UT (step S20). The processing device 103 functions as the strain detector 103D and thus determines whether the movement of the eyelids of the target user UT is the first state or not (step S22). When the movement of the eyelids of the target user UT is the first state (YES in step S22), the processing device 103 functions as the image processing controller 103E and thus lowers the brightness of the first part P1 of the pro lection image PC (step S24). As described above, the first part P1 of the projection image PC is the part viewed by the target user UT, for example, a part where the display is changed in response, to a touch by the target user UT. Meanwhile, when the movement of the eyelids of the target user UT is not the first state (NO in step S22), the processing device 103 returns the processing to step S16.

After lowering the brightness of the first part P1 of the projection image PC in step S24, the processing device 103 functions as the user detector 103C and thus determines whether the target user UT is viewing the first part P1 or not (step S26). When the target user UT is viewing the first part P1 (YES in step S26), the processing device 103 returns the processing to step S16. In this case, the state where the brightness of the first part P1 is lowered continues. When the target user UT touches the projection area FP again and changes the projection image PC after the processing is returned to step S16, the processing device 103 maintains the state of lowered brightness in the part changed in response to the touch, as a new first part P1.

When the target user UT is no longer viewing the first part P1 (NO in step S26), the processing device 103 functions as the image processing controller 103E, thus restores the original brightness of the first part P1 darkened in step S24 (step S28), and then returns the processing to step S12.

4. Example of Setting for First Part P1

As described above, in the display system 1, when it is predicted that the target user UT the viewing projection image PC has eyestrain, the brightness of the first part P1 corresponding to the target user UT is lowered to alleviate the eyestrain of the target user UT. Meanwhile, in this embodiment, the projection area FP is a broad range and a plurality of users U may simultaneously view the projection image PC. Therefore, for example, if the entirety of the projection image PC is darkened based on the movement of the eyelids of one target user UT, the other target user(s) UT with no eyestrain may feel that something is wrong or may find the image less visible because the projection image PC viewed by these other target user(s) UT is suddenly darkened. Thus, when a target user UT has eyestrain, which part of the projection image PC, should be darkened is a subject that matters. That is, which area is defined as the first part P1 is a subject that matters.

Example of Setting 1: Using Image Changed by Touch as Reference

It is preferable that the first part P1 includes, for example, the part viewed by the target user UT with eyestrain. As described above, the projection image PC changes in response to a touch by the user U. It is highly likely that the target user UT is viewing the part changed in response to the target user UT's own touch. Therefore, in the example of setting 1, the part of the projection image PC changed in response to the touch by the target user UT is defined as the first part P1.

Figure 5:
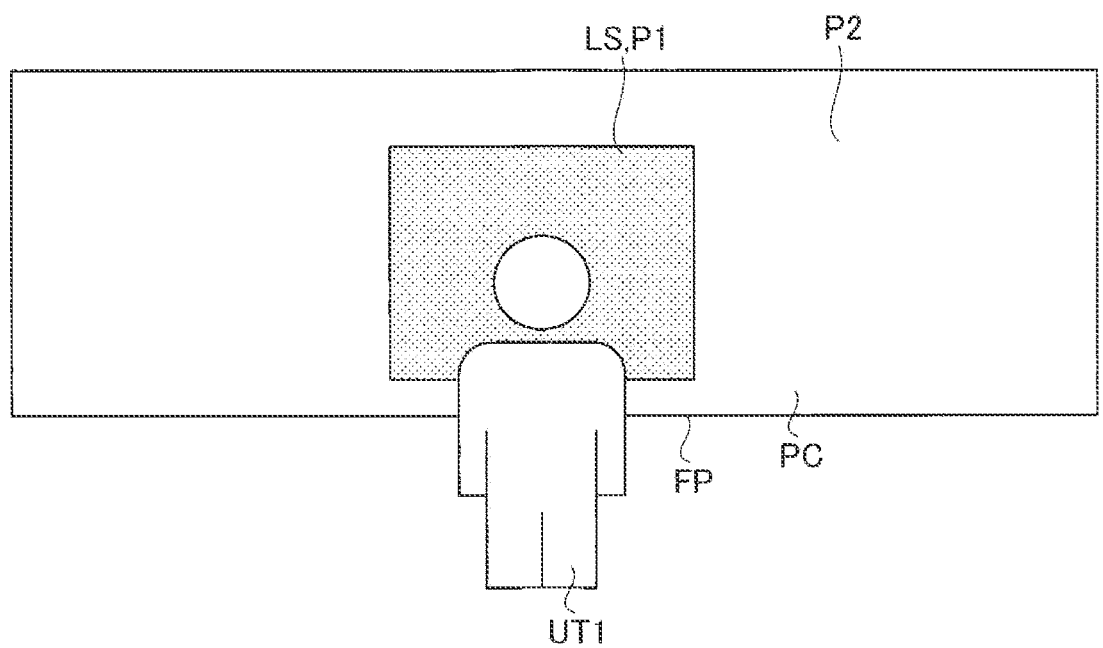
FIG. 5 schematically shows a case where a target user is viewing the projection image alone.

FIG. 5 schematically shows a case where a target user UT1 is viewing the projection image PC alone. FIG. 5 shows the target user UT1 from behind. In FIG. 5, the list LS of restaurants shown in FIG. 2B is displayed in she projection area FP. It is assumed that the list LS of restaurants is displayed as a part of the projection image PC as a result of the target user UT1 touching the icon IC1 corresponding to "dining" from among the plurality of icons IC shown in FIG. 2A. The target user UT1 is viewing the projection image PC alone and the list LS of restaurants is located at a position facing the target user UT1.

When the movement of the eyelids of the target user UT1 turns into the first state while the target user UT1 is viewing the list LS of restaurants, the processing device 103 makes the luminance of the part where the list LS of restaurants is displayed, lower than the brightness of the other parts of the projection image PC. Consequently, the brightness of the part where the list LS of restaurants is displayed is lowered. That is, the list LS of restaurants becomes the first part P1. Also, the other parts than the list LS of restaurants, of the projection image PC, are the second part P2, where the original brightness is maintained.

Figure 6:
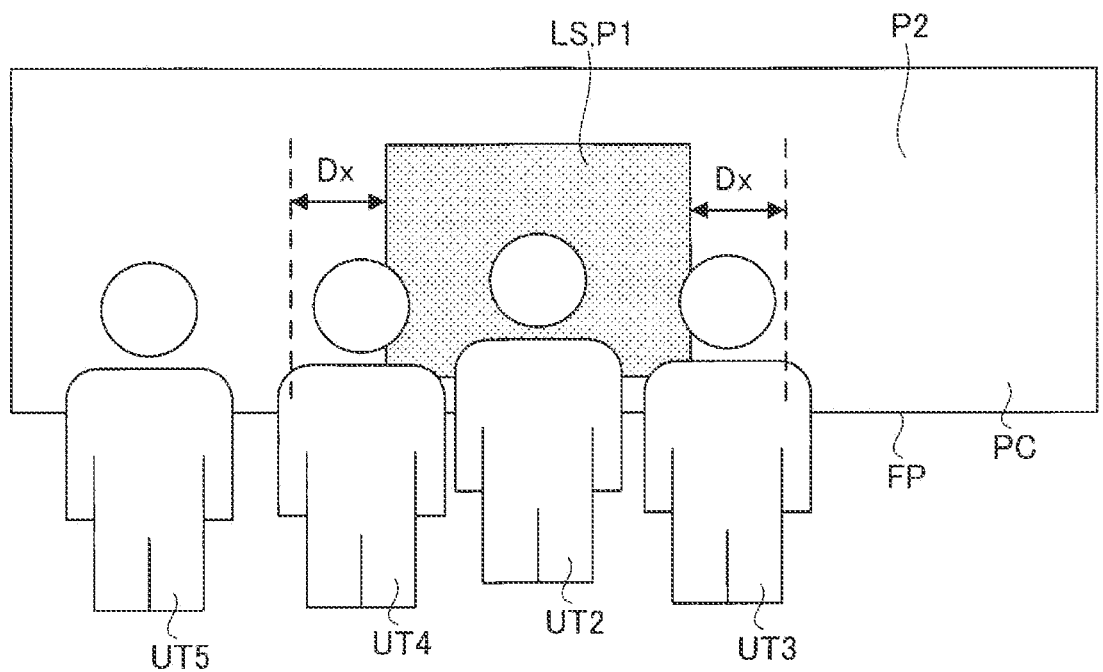
FIG. 6 schematically shows a case where a plurality of target users are located near the projection image.

FIG. 6 schematically shows case where a plurality of target users UT2 to UT5 are located near the projection image PC. FIG. 6 shows the target users UT2 to UT5 from behind. In FIG. 6, too, the list LS of restaurants shown in FIG. 2B is displayed in the projection area FP. It as assumed that the list LS of restaurants as displayed as a part of the projection image PC as a result of the target user UT2 touching the icon IC1 corresponding to "dining" from among the plurality of icons IC shown in FIG. 2A. As the plurality of target users UT are viewing the projection image PC, only the target user UT2 is fully facing the list LS of restaurants. The target users UT3 and UT4 are facing only a part of the list LS of restaurants. The target user UT5 is not facing the list LS of restaurants.

In this case, which one of the target users UT2 to UT5 is viewing the list LS of restaurants is a subject that matters. Generally, people viewing the list LS of restaurants displayed in response to the touch by the target user UT2 are users U moving around in the same group as the target user UT2. A group is, for example, a plurality of users U moving around together such as friends, family, and acquaintances. The users U in the same group are considered to be at positions closer to each other than other people who are not in the group. Also, it is highly likely that a user U who is in the same group as the target user UT2 but is at a distant position from the list LS of restaurants finds it hard to view the list LS or restaurants and is viewing another area of the projection image PC.

Thus, the processing device 103 estimates that target users UT who are at a distance Dx from the list LS of restaurants are target users UT viewing the list LS of restaurants. When the movement of the eyelids of at least one of these target users UT turns into the first state, the processing device 103 makes the brightness of the part where the list LS of restaurants is displayed, lower than the brightness of the other parts of the projection image PC.

That is, in the projector 10, when the plurality of target users UT2 to UT4 are located within the distance Dx from the list LS of restaurants, the strain detector 103D detects the movement of the eyelids of each of the target users UT2 to UT4. When the movement of the eyelids of one of the plurality of target users UT2 to UT4 is the first state, the image processing controller 103E makes the brightness of the list LS of restaurants lower than the brightness of the list LS of restaurants as of when the movement of the eyelids of all of the target users UT2 to UT4 is the second state. For example, the target user UT2 is an example of a first user. The target user UT3 is an example of a second user. The distance Dx is art example of a first distance.

In the example shown in FIG. 6, the processing device 103 employs the distance Dx from the edges in the direction of the width of the list LS of restaurants and estimates that a target user UT at a position facing the list LS of restaurants within the distance Dx from the list LS of restaurants is a target user UT viewing the list LS of restaurants. The target user UT at a position facing the list LS of restaurants within the distance Dx from the list LS of restaurants is, for example, a target user UT whose two eyes are at a position facing the list LS of restaurants within the distance Dx from the list LS of restaurants. In this case, in the example shown in FIG. 6, the target users UT2 to UT4 are estimated to be target users UT viewing the list LS of restaurants and the target user UT5 is not estimated to be a target user UT viewing the list LS of restaurants.

When the movement of the eyelids of at least one of the target users UT2 to UT4 turns into the first state, the processing device 103 makes the brightness of the part where the list LS of restaurants is displayed, lower than the brightness of the other parts. That is, the list LS of restaurants is the first part P1 to the target users UT2 to UT4. Meanwhile, when the movement of the eyelids of the target user UT5 turns into the first state, the processing device 103 does not lower the brightness of the part where the list LS of restaurants is displayed. That is, the list LS of restaurants is not the first part P1 to the target user UT5.

Other than the method in which the brightness of the list LS of restaurants is lowered when a group or people are viewing the list LS of restaurants and at least one target user UT in the group has eyestrain as described above, for example, a method in which the brightness of the list LS of restaurants is lowered only when the target user UT performing a touch operation has eyestrain may be employed. In this case, the brightness of the projection image PC can be changed according to the state of the eyes of the target user UT actively operating the screen. Particularly when a Group of people are viewing the projection image PC, a drop in the brightness of the projection image PC, in a short period can be avoided. Also, when one target user UT is viewing the projection image PC alone, the user U performing a touch operation can be identified and the part viewed by the target user UT can thus be specified more securely.

In this case, the user detector 103C specifies the user U who has touched the touch position TP, based on second calibration data, the second captured image captured by the second image pickup device 14B, and the touch position TP on the projection area FP detected by the touch detector 103A. The second calibration data is data establishing the correspondence between coordinates on the projection area FP and coordinates on the second captured image. As the correspondence between coordinates on the projection area FP and coordinates on the second captured image are established, the user U who has touched the touch position TP on the projection area FP can be specified. Specifically, the user detector 103C may detect, for example, a movement of a hand of the user U appearing in the second captured image and thus specify the user U who has touched the touch position TP.

That is, when the target user UT touches the projection area FP and the movement of the eyelids of the target user UT is the first state, the image processing controller 103E may make the brightness of the first part P1 lower than the brightness of the first part P1 as of when the target user UT touches the projection area FP and the movement of the eyelids of the target user UT is the second state.

Example of Setting 2: Using Position of Target User UT as Reference

As described above, it is preferable that the first part P1 includes the part viewed by the target user UT with eyestrain. Generally, it is highly likely that the position viewed by the target user UT is near the target user UT. Therefore, in the example of setting 2, a part of the projection image PC that is within a predetermined distance from the target user UT is defined as the first part P1.

Figure 7A:
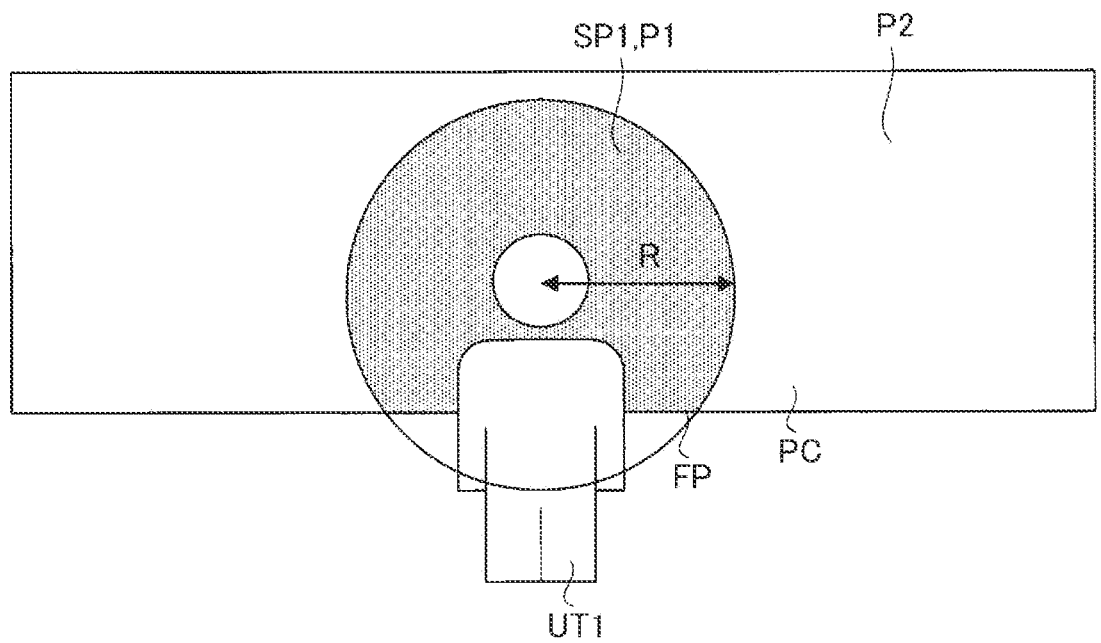
FIG. 7A schematically shows a case where the target user is viewing the projection image alone.
Figure 7B:
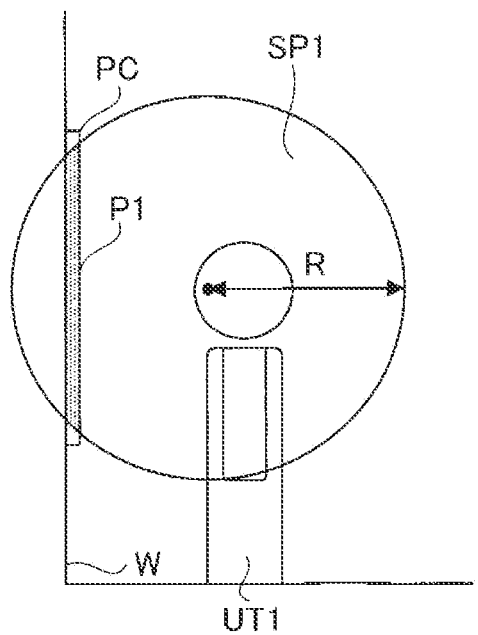
FIG. 7B schematically shows case where the target user is viewing the projection image alone.

FIGS. 7A and 7B schematically show a case where the target user UT1 is viewing the projection image PC alone. FIG. 7 shows the target user UT1 from behind. FIG. 7B shows the target user UT1 from a lateral side. In FIG. 7B, the projection image PC is illustrated as a three-dimensional object. However, this is for the purpose of specifying the first part P1 in the illustration. In practice, the projection image PC is projected on the wall W.

For example, an area specified as a sphere with a radius R from an intermediate point between the two eyes of the target user UT1 as a reference point is defined as a specified area SP1. The radius R can be approximately 1 meter, for example. When the movement of the eyelids of the target user UT1 turns into the first state, the processing device 103 defines a part of the projection image PC that overlaps the specified area SP1 of the target user UT1, as the first part 31. The first part P1 is indicated by hatching. In this case, the first part P1 becomes broader as the target user UT1 gets closer to the projection area FP. Also, the first part P1 is no longer set when the target user UT1 moves away to a distance equal to or longer than the radius R from the projection area FP.

Thus, the first part P1 can be set regardless of whether the projection image PC changes in response to a touch operation or not. Also, since the first part P1 is set based on the distance from the target user UT regardless of the display content of the projection image PC, the processing load on the processing device 103 can be reduced.

Figure 8:
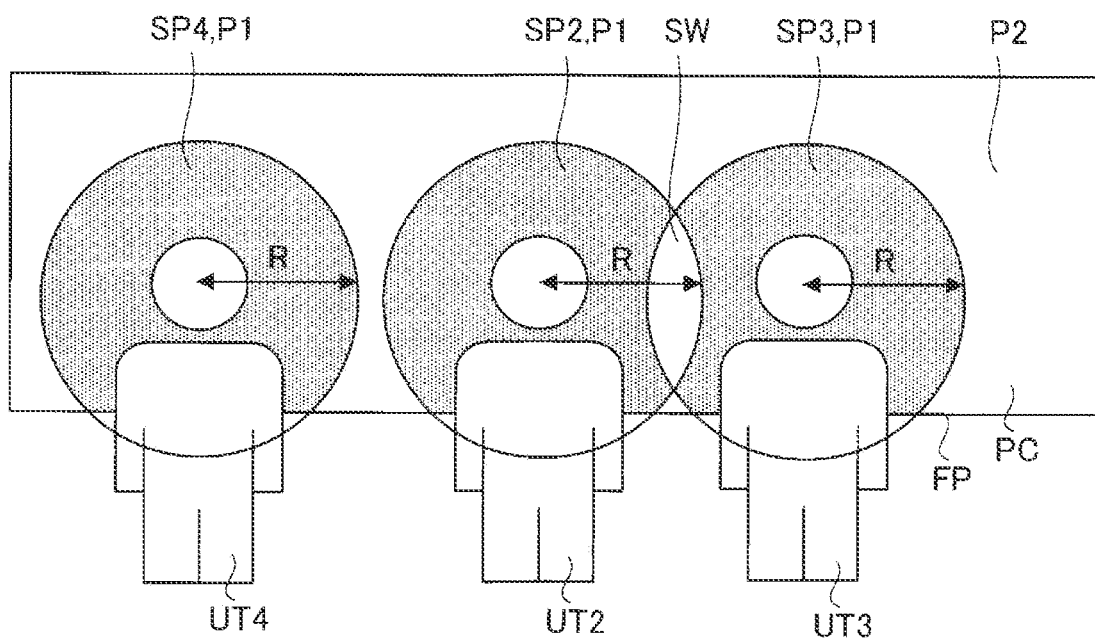
FIG. 8 schematically shows a case where a plurality of target users are located near the projection image.

FIG. 8 schematically shows a case where a plurality of target users UT2 to UT4 are located near the projection image PC. FIG. 8 shows the target users UT2 to UT4 from behind. In FIG. 8, too, for example, specified areas SP2 to SP4 specified as spheres with a radius R from an intermediate point between the two eyes of each of the target users UT2 to UT4 as a reference point are set. When the movement of the eyelids of one of the target users UT2 to UT4 turns into the first state, the processing device 103 defines a part of the projection image PC that overlaps the specified area SP of the corresponding target user UT, as the first part P1. For example, when the movement of the eyelids of the target user UT4 turns into the first state, the processing device 103 lowers the brightness of a part of the projection image PC that overlaps the specified area SP4, as the first part P1.

It is now assumed that the plurality of target users are located closely to each other and that the specified areas SP overlap each other. Specifically, in FIG. 8, an overlap area SW where the specified area SP2 of the target user UT2 and the specified area SP3 of the target user UT3 overlap each other exists. In this case, when the movement of the eyelids of only one of the target users UT2 and UT3 turns into the first state, the processing device 103 defines a part excluding the overlap area SW, of the specified area SP of the target user UT whose eyelid movement has turned into the first state, as the first part P1. For example, when the movement of the eyelids of the target user UT is the first state and the movement of the eyelids of the target user UT3 is not the first state, the processing device 103 lowers the brightness of a part of the projection image PC that overlaps the specified area SP2 and that is not included in the overlap area SW, as the first part P1.

Thus, the brightness of a major part of the part viewed by the target user UT2 is lowered, whereas the brightness of the part viewed by the target user UT3 is not changed. That is, when only a part of a plurality of target users UT has eyestrain, the range of the field of view of the target user UT with eyestrain is darkened, whereas the field of view of the other target user(s) can be prevented from being darkened. Therefore, the visibility of the projection image PC can be improved.

5. Overview

As described above, the display system 1 differentiates the brightness of the first part P1, which is the part corresponding to the target user UT of the projection image PC, from the other parts, based on the movement of the eyelids of the target user UT. That is, the display system 1 changes only the brightness of the first part P1 corresponding to the target user UT, of the projection image PC that can be viewed by a plurality of users U, based on the movement of the eyelids of the target user UT. Thus, when the brightness of the projection image PC is changed, the influence of the change on the other users than the target user UT can be restrained. Therefore, convenience is less likely to be reduced even when a plurality of users view the projection image PC.

When the movement of the eyelids of the target user UT is the first state, the display system 1 makes the brightness of the first part P1 lower than the brightness of the first part P1 as of when the movement of the eyelids of the target user UT is the second state. Thus, for example, when the first state is a state where the target user UT has asthenopia, the brightness of the part viewed by the target user UT can be lowered and the asthenopia of the target user UT can thus be alleviated.

In the display system 1, a part of the projection image that changes in response to a touch on the projection area FP may be defined as the first part P1. Thus, the part viewed by the target user UT can be accurately specified and the influence of lowering the brightness of the first part P1 on the other users U can be restrained.

In the display system 1, when a plurality of target users UT are present within a predetermined distance from one part of the projection image PC and the movement of the eyelids of at least one of the plurality of target users UT turns into the first state, the brightness of the one part of the projection image PC may be lowered. Thus, convenience can be improved when a group of people are viewing the same projection image PC.

In the display system 1, when the movement of eyelids of the target user UT carrying out a touch operation turns into the first state, the brightness of a part of the projection image PC that has changed in response to the touch operation may be lowered. Thus, only the state of the eyelids of the target user UT who has carried out the touch operation is reflected in the brightness of the projection image PC and the brightness of the projection image PC can be stabilized. Therefore, convenience is less likely to be reduced even when a plurality of users view the projection image PC.

In the display system 1, when the target user UT is no longer viewing the first part P1, the original brightness of the first part 91 may be restored. Thus, in the display system 1 used by a plurality of users U, the brightness of the projection image PC can be returned to the initial state when the users U change places with each other. Therefore, convenience is less likely to be reduced even when a plurality of users view the projection image PC.

In the display system 1, when the brightness of the first part P1 is changed, the target user UT may be notified of the change. Thus, when the brightness of a part of the projection image PC is lowered, the probability of the target user UT suspecting a malfunction or the like of the display system 1 is reduced and the convenience at the time of use of the display system 1 can be improved.

What is claimed is:

1. A display method comprising:
    displaying an image on a display surface;
    when a movement of eyelids of a first user is a first state, lowering a brightness of a first part of the image than an original brightness of the first part, corresponding to the first user whose face is directed to the display surface, the original brightness of the first part being the brightness when the movement of the eyelids of the first user is a second state that is different from the first state;
    detecting that the display surface is touched;
    changing one part of the image in response to the touch; and
    when within a first time period after it is detected that a position of the display surface is touched, another touch is not carried out within a second distance from the position, returning the brightness of the first part to the original brightness of the first part,
    wherein the first part includes the one part.

2. The display method according to claim 1, further comprising:
    detecting the movement of the eyelids of the first user and a movement of eyelids of a second user when the first user and the second user are located within a first distance from the one part, wherein
    the lowering the brightness of the first part from the brightness of the second part includes, when the movement of the eyelids of the first user is the first state, lowering the brightness of the first part than the original brightness of the first part.

3. The display method according to claim 1, wherein
    the lowering the brightness of the first part from the brightness of the second part includes, when the first user touches the display surface and the movement of the eyelids of the first user is the first state, lowering the brightness of the first part than the original brightness of the first part.

4. The display method according to claim 1, wherein
    when a state where the face of the first user is not directed to the display surface continues for a second time period or longer, returning the brightness of the first part to the original brightness of the first part.

5. The display method according to claim 1, wherein
    when the first user is at a third distance or farther from the display surface, returning the brightness of the first part to the original brightness of the first part.

6. The display method according to claim 1, further comprising:
    notifying the first user that the original brightness of the first part is differentiated, when the original brightness of the first part is differentiated.

7. A display system comprising:
    a display device displaying an image on a display surface; and
    one or more processors programmed for:
        outputting, to the display device, a signal representing the image in which a brightness of a first part of the image corresponding to a first user whose face is directed to the display surface is differentiated from a brightness of a second part of the image that is different from the first part, based on a movement of eyelids of the first user;
        detecting that the display surface is touched; and
        changing one part of the image in response to the touch;
        wherein the brightness of the first part is lowered below the original brightness of the first part when the brightness of the first part is lower than the brightness of the second part, the original brightness of the first part being the brightness when the movement of the eyelids of the first user is a second state that is different from the first state; and
        when within a first time period after it is detected that a position of the display surface is touched, another touch is not carried out within a second distance from the position, returning the brightness of the first part to the original brightness of the first part,
    wherein the first part includes the one part.

8. The display system according to claim 7, further comprising:
    an image pickup sensor that captures an image of an area facing the display area to output a captured image, wherein
    the one or more processors are further programmed for detecting the movement of the eyelids of the first user, based on the captured image.

9. The display system according to claim 7, wherein
    the one or more processors are further programmed for:
        detecting the movement of the eyelids of the first user and a movement of eyelids of a second user when the first user and the second user are located within a first distance from the one part,
        wherein the original brightness of the first part is the brightness when the movement of the eyelids of the first user and the movement of the eyelids of the second user are the second state.

10. The display system according to claim 7, wherein
    the brightness of the first part is lowered than the original brightness of the first part when the first user touches the display surface and when the movement of the eyelids of the first user is the first state.

11. The display system according to claim 7, wherein
    the one or more processors are further programmed for, when a state where the face of the first user is not directed to the display surface continues for a second time period or longer, returning the brightness of the first part to the original brightness of the first part.

12. The display system according to claim 7, wherein
    the one or more processors are further programmed for, when the first user is at a third distance or farther from the display surface, returning the brightness of the first part to the original brightness of the first part.

13. The display system according to claim 7, further comprising:
    the one or more processors are further programmed for notifying the first user that the original brightness of the first part is differentiated, when the original brightness of the first part is differentiated.

14. A non-transitory computer-readable recording medium storing a display program, the display program causing or more processors to execute:
- displaying an image on a display surface;
- detecting that the display surface is touched;
- changing one part of the image in response to the touch;
- lowering the brightness of the first part of the image than the original brightness of the first part corresponding to a first user whose face is directed to the display surface, the brightness of the first part being different from a brightness of a second part of the image, the second part being different from the first part, the original brightness of the first part being the brightness when the movement of the eyelids of the first user is a second state that is different from the first state; and
- when within a first time period after it is detected that a position of the display surface is touched, another touch is not carried out within a second distance from the position, returning the brightness of the first part to the original brightness of the first part, wherein the first part includes the one part.

15. The non-transitory computer-readable recording medium storing a display program according to claim 14, wherein
the display program causes the one or more processors to further execute:
detecting the movement of the eyelids of the first user and a movement of eyelids of a second user when the first user and the second user are located within a first distance from the one part,
wherein the original brightness of the first part is the brightness when the movement of the eyelids of the first user and the movement of the eyelids of the second user are the second state.

16. The non-transitory computer-readable recording medium storing a display program according to claim 14, wherein
the brightness of the first part is lowered below the original brightness of the first part, the original brightness of the first part being the brightness when the first user touches the display surface and when the movement of the eyelids of the first user is the second state.

17. The non-transitory computer-readable recording medium storing a display program according to claim 14, wherein
the display program causes the one or more processors to further execute, when a state where the face of the first user is not directed to the display surface continues for a second time period or longer, returning the brightness of the first part to the original brightness of the first part.

18. The non-transitory computer-readable recording medium storing a display program according to claim 14, wherein
the display program causes the one or more processors to further execute, when the first user is at a third distance or farther from the display surface, returning the brightness of the first part to the original brightness of the first part.

19. The non-transitory computer-readable recording medium storing a display program according to claim 14, wherein
the display program causes the one or more processors to further execute notifying the first user that the original brightness of the first part is differentiated, when the original brightness of the first part is differentiated.

* * * * *

UNITED STATES PATENT AND TRADEMARK OFFICE
CERTIFICATE OF CORRECTION

| | |
|---|---|
| PATENT NO. | : 11,854,502 B2 |
| APPLICATION NO. | : 17/965993 |
| DATED | : December 26, 2023 |
| INVENTOR(S) | : Yoshitaka Nakashin |

It is certified that error appears in the above-identified patent and that said Letters Patent is hereby corrected as shown below:

On the Title Page

In the first column after Item "(65) Priority Publication Data", please insert the following data below:
--(30) Foreign Application Priority Data
Oct. 15, 2021 (JP).................................2021169378--

Signed and Sealed this
Ninth Day of July, 2024

Katherine Kelly Vidal
*Director of the United States Patent and Trademark Office*